STORAGE FACILITY

Filed June 10, 1958

11 Sheets-Sheet 1

INVENTORS
MERVYN G. GASKIN
VINCENT S. HOURIGAN
BY Burton & Parker
ATTORNEYS

May 1, 1962 M. G. GASKIN ETAL 3,032,212

STORAGE FACILITY

Filed June 10, 1958 11 Sheets-Sheet 2

INVENTORS

MERVYN G. GASKIN

VINCENT S. HOURIGAN

BY Burton & Parker

ATTORNEYS

INVENTORS
MERVYN G. GASKIN
VINCENT S. HOURIGAN
BY Burton & Parker
ATTORNEYS

May 1, 1962 M. G. GASKIN ETAL 3,032,212

STORAGE FACILITY

Filed June 10, 1958 11 Sheets-Sheet 4

INVENTORS

MERVYN G. GASKIN
VINCENT S. HOURIGAN

BY Burton & Parker

ATTORNEYS

STORAGE FACILITY

Filed June 10, 1958 11 Sheets-Sheet 6

INVENTORS
MERVYN G. GASKIN
VINCENT S. HOURIGAN
BY Burton & Parker
ATTORNEYS

May 1, 1962 M. G. GASKIN ET AL 3,032,212

STORAGE FACILITY

Filed June 10, 1958 11 Sheets-Sheet 7

INVENTORS

MERVYN G. GASKIN
VINCENT S. HOURIGAN

BY Burton & Parker

ATTORNEYS

May 1, 1962 M. G. GASKIN ETAL 3,032,212

STORAGE FACILITY

Filed June 10, 1958 11 Sheets-Sheet 8

INVENTORS
MERVYN G. GASKIN
VINCENT S. HOURIGAN
BY
Burton & Parker
ATTORNEYS

STORAGE FACILITY

Filed June 10, 1958

INVENTORS

BY MERVYN G. GASKIN
VINCENT S. HOURIGAN

Burton & Parker
ATTORNEYS

May 1, 1962 M. G. GASKIN ETAL 3,032,212

STORAGE FACILITY

Filed June 10, 1958 11 Sheets-Sheet 10

INVENTORS
MERVYN G. GASKIN
BY VINCENT S. HOURIGAN

Burton & Parker

ATTORNEYS

INVENTORS
MERVYN G. GASKIN
VINCENT S. HOURIGAN
BY
Burton & Parker
ATTORNEYS 3,032,212
Patented May 1, 1962

3,032,212

STORAGE FACILITY

Mervyn G. Gaskin, Grosse Pointe, and Vincent S. Hourigan, Highland Park, Mich., assignors to Taylor & Gaskin, Inc., Detroit, Mich., a corporation of Michigan Filed June 10, 1958, Ser. No. 741,087
10 Claims. (Cl. 214—16.1)

This invention relates to a method of and apparatus for handling dollies arranged in parallel spaced-apart trains whereby any selected dolly may be expeditiously delivered to a load-handling station and from which the dolly may be returned to any one of the several trains without regard to the train from which it may have originated.

The invention has particular utility in the temporary storage of relatively heavy articles such as automobiles and goods in transit stored in warehouses, as well as many other applications unnecessary to mention.

The embodiment of the invention herein disclosed is a parking facility for automobiles. In general the embodiment comprises a structure having a plurality of parallel vertically spaced-apart decks or tracks upon each of which is disposed a continuous train of dollies. An elevator at one end of the structure housing a dolly at each deck level, and a lowerator at the opposite end of the structure communicating with the opposite end of the decks, permit the transfer of dollies between, for example, the ground level deck and any other deck.

One or more load-handling stations are provided adjacent the ground level deck; for example, a loading station at the foot of the elevator and an unloading station at the foot of the lowerator. To bring any selected dolly into a load-handling station, the deck train containing the selected dolly, and assuming the selected dolly is not in the ground level deck train, is successively stepped toward the lowerator while the ground level deck is successively stepped toward the elevator. The lowerator and elevator operate in synchronism with the deck train movements to transfer dollies from the head of the deck train containing the selected dolly to the tail of the ground level deck train, the movement being in the form of a closed loop. If the selected dolly is disposed in the ground level deck train, then such train and the deck train closest to it are cycled as a loop in the fashion aforementioned.

In general, the primary object of the present invention is to improve upon the prior art practices by including in one storage facility one or more of the following improvements: utilization of the space occupied by the elevator for the storage of dollies, specifically by storing dollies in the elevator at each deck level, while concurrently having continuous trains of dollies filling each of the decks; decreasing the time required to process one or more selected dollies through the load-handling stations and thereby expedite the handling of loads either waiting to be stored in the facility or selected for withdrawal from the facility; and operating the facility automatically, i.e., with the minimum of attention by an operator.

While the prior art has suggested that dollies might be stored in the elevator and concurrently on the decks, either all of the decks were not fully occupied by continuous trains of dollies at the time dollies were stored in the elevator, or the time element in bringing any selected dolly to a load-handing station was unimportant. For example, the time element in bringing any particular dolly expeditionsly to a load-handling station was of no importance in the U.S. patent of Rapp, No. 1,577,589, which discloses dollies in the elevator as well as in continuous trains on the decks. The U.S. patent to Walker, No. 2,569,393, while appreciating that the time element in delivering any selected dolly to a load-handling station was important, carefully pointed out that when all the storage decks were full of continuous trains of dollies, the ground level deck and the elevator and lowerator were empty. Where the prior art, as represented by the Walker patent, has suggested that a selected dolly might be brought to a load-handling station by moving only those dollies in the same train lying between it and the load-handling station, thereby reducing the time required to bring the dolly to the load-handing station, the dolly thereafter had to be returned to the deck from which it originated, and this necessity imposed a serious restriction upon the efficient operation of the storage facility.

The primary difficulty encountered when attempting to store dollies in the elevator at each deck level while concurrently having each deck filled with a continuous train of dollies, and also move only those dollies lying between a selected dolly and its destined load-handling station in bringing the selected dolly to the station, is that the dollies stored in the elevator are, in a sense, "lost" in the facility. This occurs because the deck train the dollies enter when leaving the elevator is determined not by any prearranged pattern of dolly movement through the facility such as disclosed in the Walker patent, but rather by the location of the deck train containing the selected dolly wanted at the load-handling station; the dollies in the elevator entering such deck train to replace the dollies therein which move toward the handling station via the lowerator.

With available ground space in most metropolitan areas at a premium, together with a serious parking problem for automobiles and high labor costs, it has become imperative to develop a parking facility which allows the storage of a greater number of vehicles per square foot of ground space than has been heretofore suggested, and that permits one operator to process a greater number of vehicles at a faster rate. The invention disclosed herein fulfills all of these requirements in a novel and highly satisfactory fashion.

Another object of the invention is the provision of an automatic control system for a storage facility which allows the following operations to be accomplished: (1) after each dolly has been loaded, and unless the system receives other instructions, it will automatically store the loaded dolly in the facility and deliver to the loading station that empty dolly closest to the station; (2) upon receiving a request for any particular loaded dolly, the system will locate the position of the dolly in the facility and cause the facility to bring the dolly to the unloading station; (3) if, as a selected dolly is being delivered to a load-handling station, the control system receives instructions to deliver additional dollies to either the same or another load-handling station and such latter dollies will, in the normal procedure of delivering the first selected dolly, pass through their designated handling station prior to the arrival of the first selected dolly at its handling station, the system will stop the subsequently selected dollies at their destined station to allow load-handling operations and thereafter continue the movement until the originally selected dolly is delivered to its destined station; (4) upon one instruction the system will automatically and successively deliver all loaded dollies to the unloading station.

As is hereinafter disclosed, the control system for the storage facility includes a memory device, a detector, and an electric circuit which sends instructions to the trains of dollies to effect their movement. The movement of the dollies is controlled by the control system which has a number of spaced trains or rows of dummies corresponding to the trains of dollies and with each dummy corresponding to a particular dolly, with the dummies movable to establish the pattern and control the movement of the dollies. The control system has an operator's keyboard with a button for each dummy, the dummies being housed in the detector. When a particular button is pushed, that train in which the selected dummy is located is caused to cycle or move in a closed path or loop with another train of dummies through the detector causing similar movement of corresponding trains of mated dollies. Interlocks are provided for ensuring continued substantially duplicate movement between a dummy and its mated dolly so that the control system at all times can identify, locate, and deliver a selected dolly to the loading or unloading stations.

Hereinafter the instant invention will be discussed as applied to an automatic parking garage. The parking garage is uniquely designed to comprise basic units which may be increased in number to increase storage capacity in three directions. The invention will be described hereinafter as a facility having a main deck, at ground level, and two secondary decks above the ground level deck. Decks may be added to the top of the garage to vertically increase the storage capacity. Also another garage of any number of decks may be placed alongside the previously existing garage to increase the capacity. The length of the decks may be increased or decreased by adding or subtracting internal track sections. This modular design enables builders to plan a facility for any size area with great flexibility. It will be recognized that the invention may be adapted for use in various manners with suitable adjustments were necessary. While the instant disclosure specifically shows a vertical stack of parallel decks with the bottom deck being at the ground level, it will be appreciated as the description proceeds that the trains of dollies might be disposed in other spaced relationships as, for example, in horizontal planes or with secondary decks or trains buried in the ground beneath the ground level deck.

The foregoing and other objects and advantages of the present invention will become apparent to those skilled in the art upon consideration of the following detailed description of the preferred embodiment thereof, reference being made to the accompanying drawings wherein:

FIG. 8–1 through FIG. 8–7 is a series of schematic diagrams of the relationship of the memory unit carriage conveyor chain and lugs through various stages of operation of the memory unit;

Figure 14:
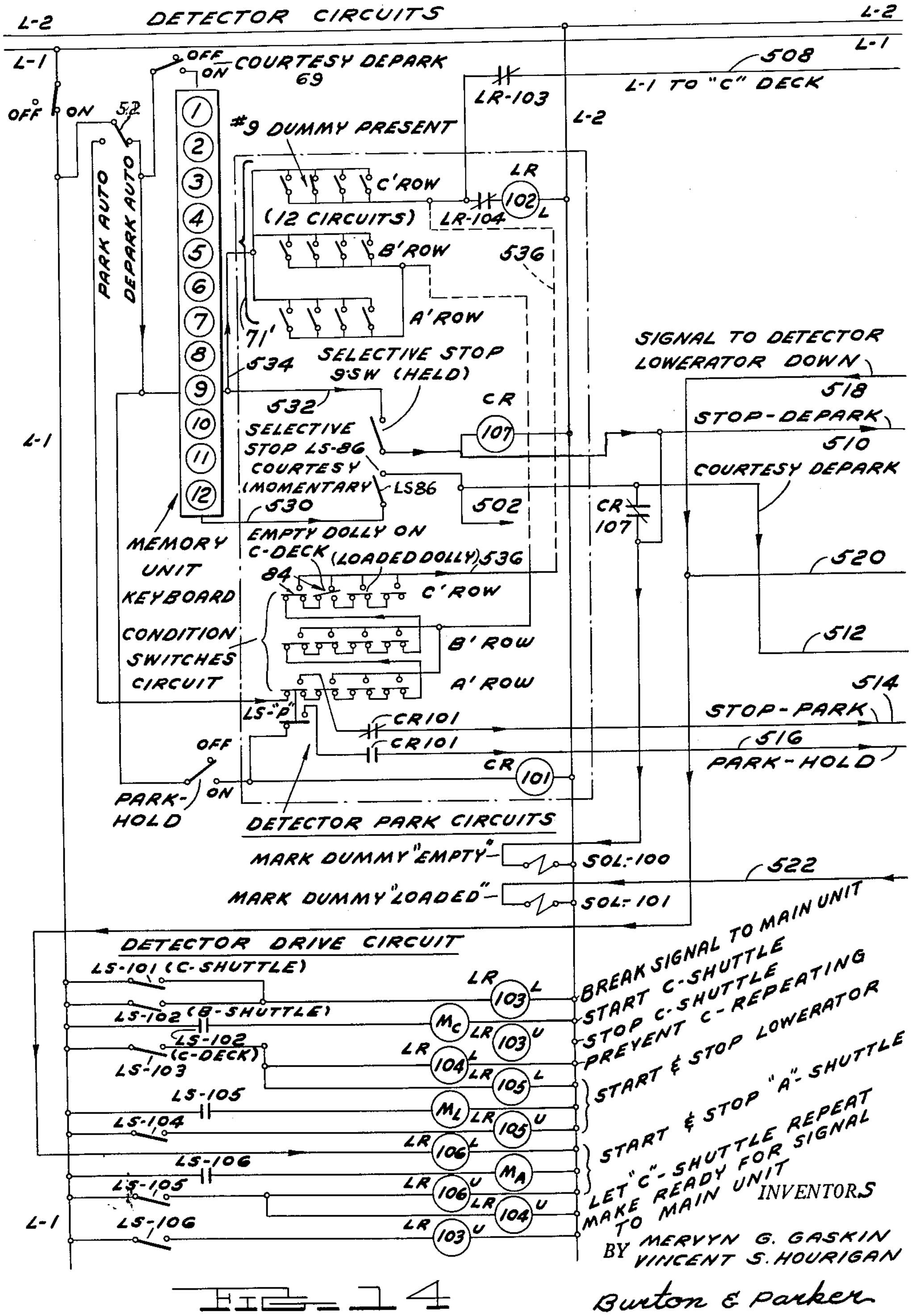
FIG. 14 is a schematic wiring diagram of the detector circuits.
Figure 15:
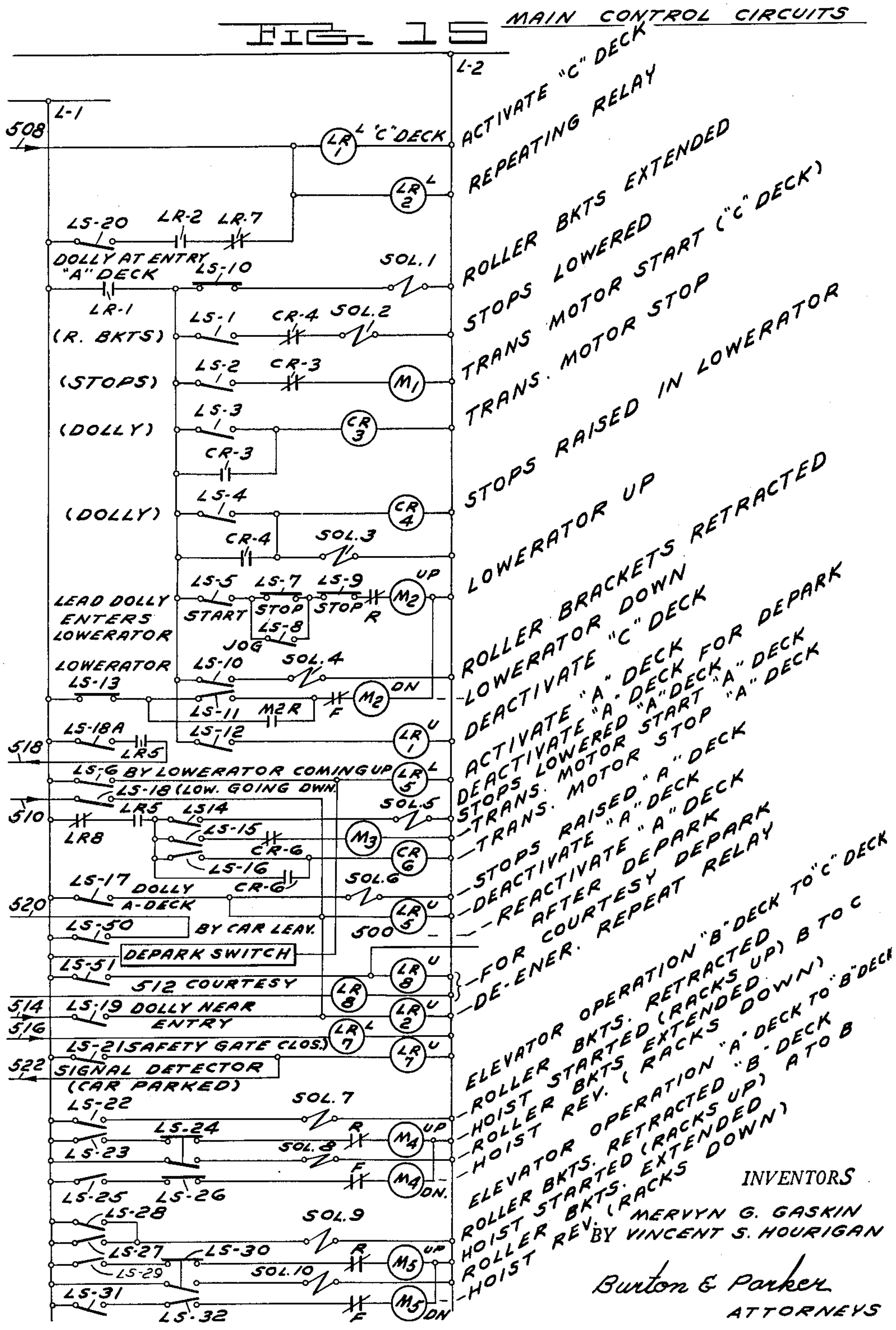
Figure 16:
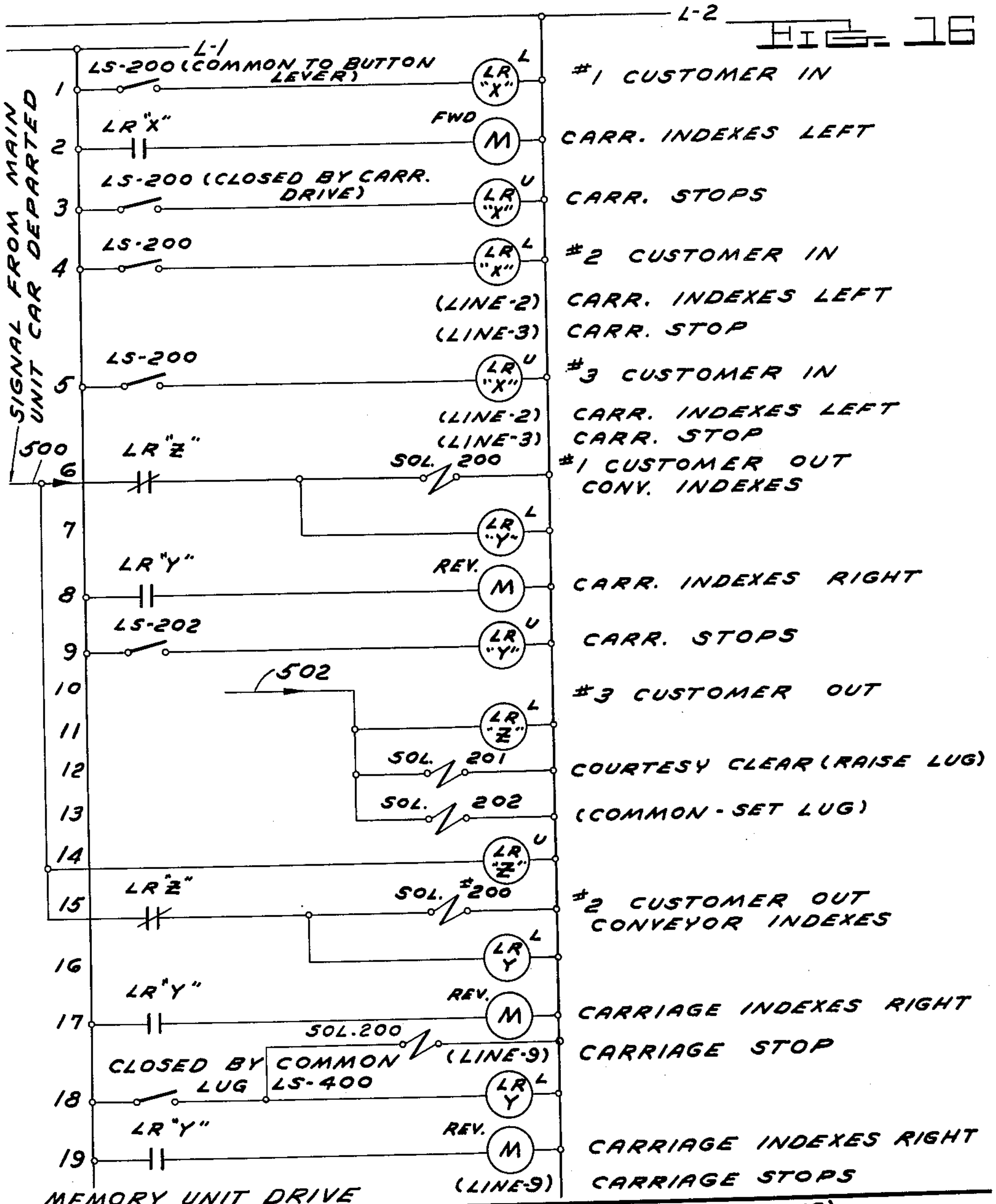

FIG. 14–*a* is a schematic wiring diagram of the detector drive circuits and is a continuation of FIG. 14;

FIG. 15 is a schematic wiring diagram of the main control circuits; and,

FIG. 16 is a schematic wiring diagram of the memory unit drive circuits.

Figure 1:
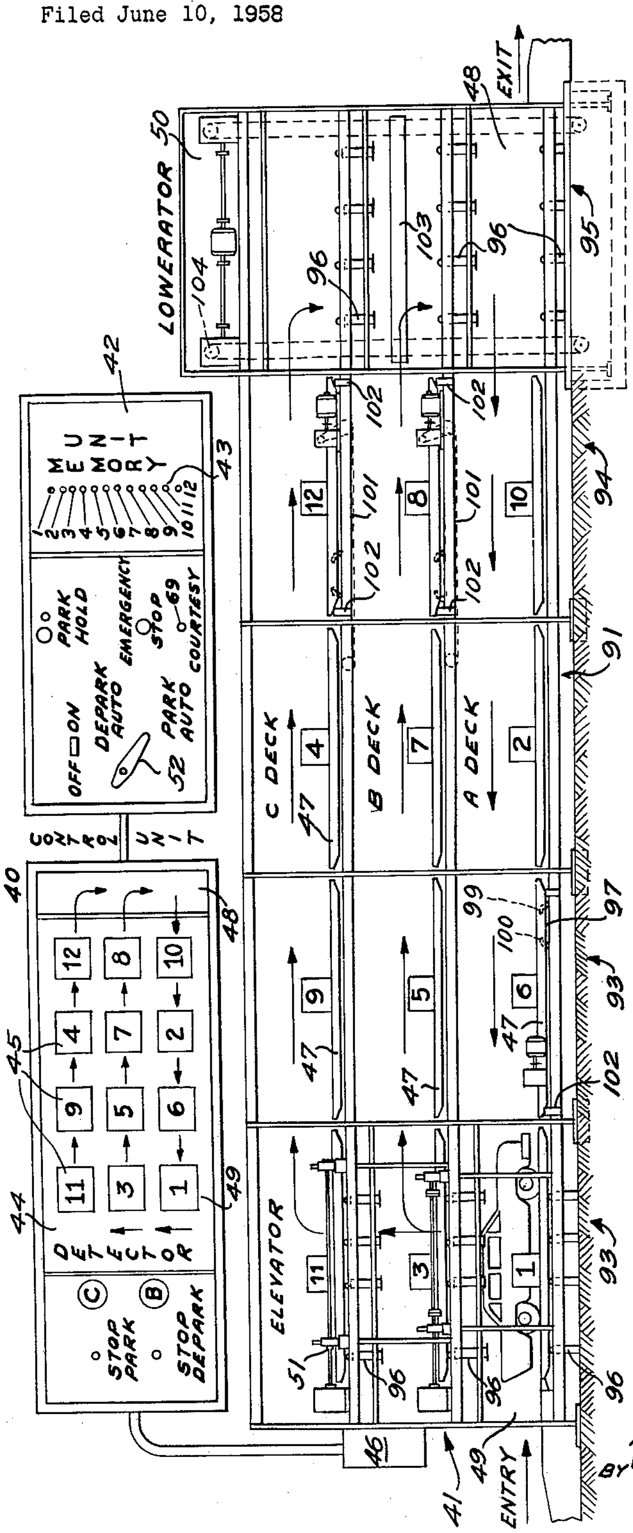
FIG. 1 is a diagrammatic side elevational view of a multi-level facility.
Figure 2:
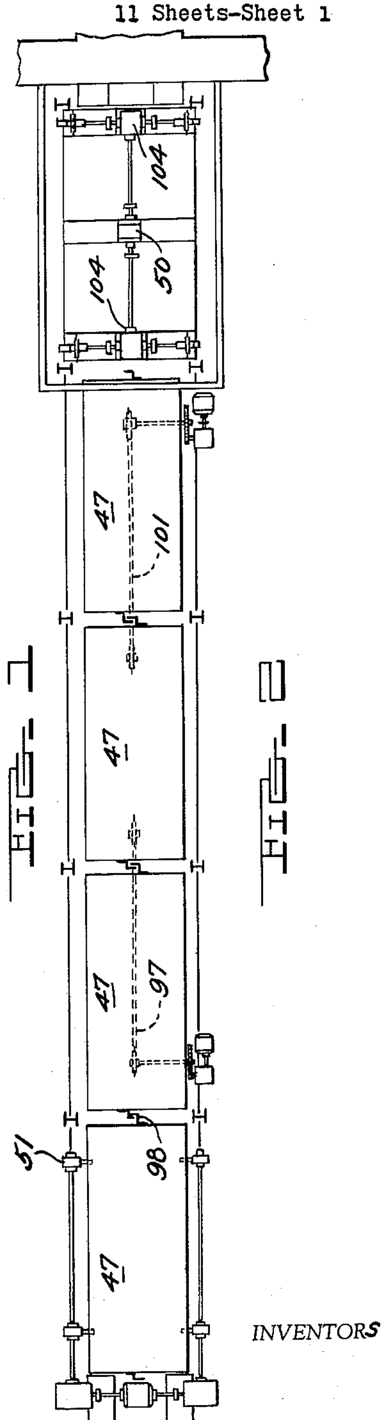
FIG. 2 is a diagrammatic top view of the garage.

Referring now to FIGS. 1 and 2, it will be seen that the invention includes a control system or unit indicated by numerals 40 and 46 and a garage indicated by numeral 41. The control unit 40 is made up of a memory unit 42 having buttons 43 for each dummy-dolly combination in the facility, these buttons 43 being actuated by an operator of the facility. The control unit 40 also includes a detector 44 which houses the dummies 45 and the necessary means for causing movement of the dummies through closed loops or paths. Signals passing from the memory unit 42 to the detector 44 are then transferred to the control box 46 housing the main control circuits, which in turn controls operation of the machinery in the facility to move the dollies 47.

The garage 41 has a main deck A and two secondary decks B and C; the detector 44 likewise has a bottom row A′ and two secondary rows B′ and C′. In the detector there is a dummy for each dolly in the parking structure, and the dummy in the detector and its mated dolly maintain corresponding positions with respect to other dummy-dolly combinations. Means are provided in both detector and garage for moving a dummy-dolly combination from any spatial location to their respective exits 48 or entries 49. It will be noted that each deck of the garage is filled by a continuous train of dollies and that the elevator 51 is supporting a dolly at the level of each deck.

Figure 13:
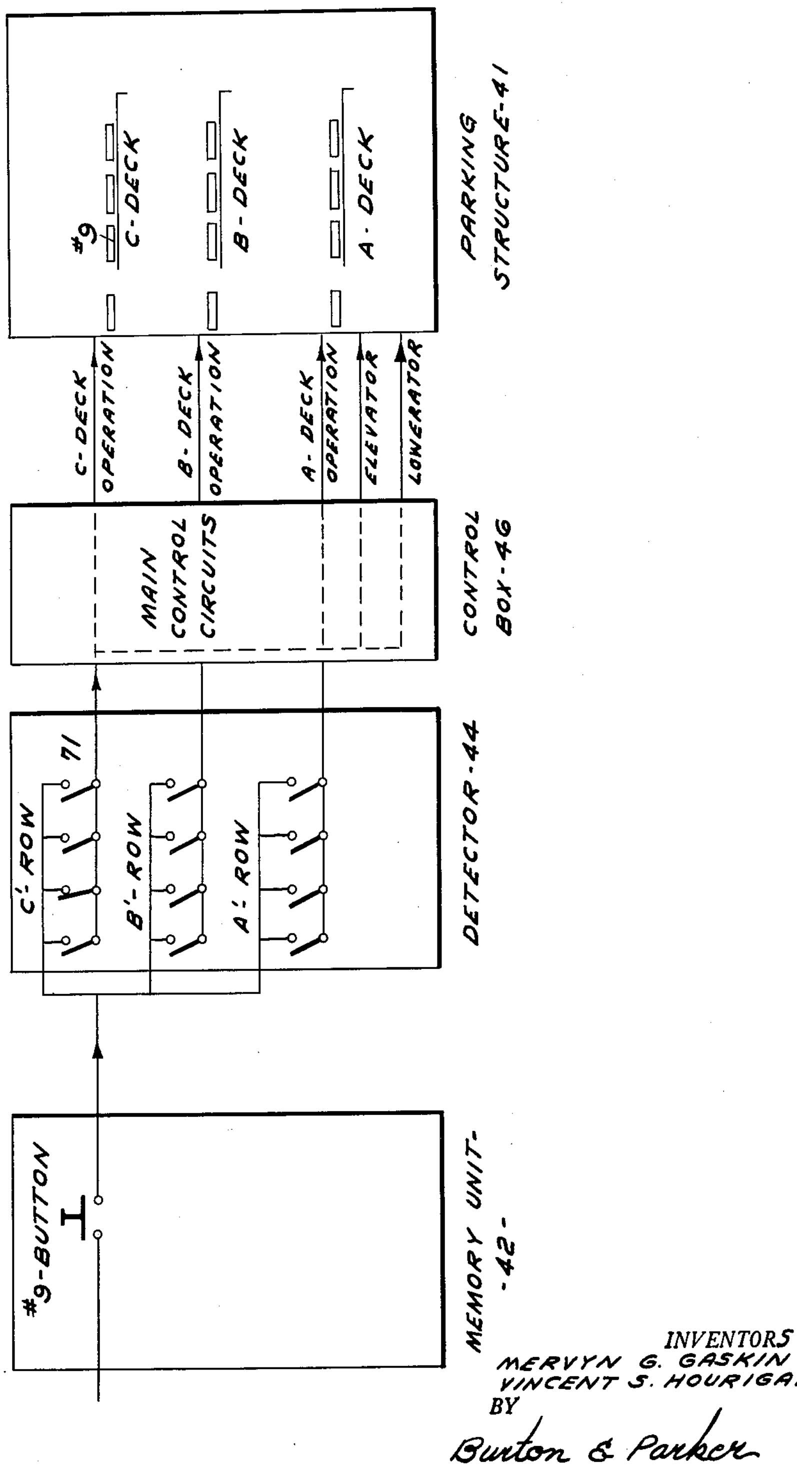
FIG. 13 is a schematic circuit diagram of the relationship between the memory unit, the detector, the main control circuits and the parking structure showing their operational relationships.

Assuming dolly #9 is selected for movement to the exit 48 and referring to FIGS. 1 and 13, the operator would press button #9 in the memory unit 42. This signal then would be received in the detector 44 which would search for and find dummy 9 in C′ row, thereby energizing a C deck relay in the control box 46 at the garage which would cause cycling of C deck with the main deck. C′ row in the detector would also cycle with the main row A′. The cycling of the detector and the garage involves similar movements of mated dummy-dolly combinations. In the garage the train of dollies on C deck would move forward to place dolly 12 in the lowerator 50, the lowerator then carrying dolly 12 downwardly to the exit 48, and during this movement the hoist 51 would be moving dollies 3 and 1 upwardly one deck level to fill the rear end of C deck and clear the entry 49 of the main deck. Dolly 12 would then be moved in a train with the other remaining dollies on the main deck to move dolly 6 into the entry and to clear the exit. Dummy 12 in the detector 44 would be similarly moved, and a complete cycle in the detector and garage will be completed when dummy 12 and dolly 12 are moved rearwardly to a position adjacent their exits 48. Since the #9 dolly has not arrived at its exit, the detector and garage will continue to cycle, causing dummy 4 and dolly 4 to travel the path previously traveled by dummy 12 and dolly 12. Cycling will repeat for the third time to place dummy 9 and dolly 9 at their exits, at which time cycling will be interrupted until the customer has removed his car from the #9 dolly and tripped a safety switch as by his car's front and back wheels which enables the third cycle to be completed by the rearward movement of dummy-dolly #9 to a position adjacent their exits.

The above-described operation is a deparking operation whereby the operator of the facility may, by merely pressing a button on the memory unit 42 in the control system, cause the facility to deliver the desired dolly to the exit. To operate the facility in this manner the main switch 52 shown in FIG. 1 and hereinafter described would be turned to "Depark Auto."

Assuming some dollies are loaded and it is desired to park cars, switch 52 is turned to "Park Auto," which causes the detector to search for an empty dolly and cycle the facility until the empty dolly presents itself at the garage entry 49. After a car has been parked on the dolly and as the driver leaves the car and closes, for example, a safety gate around the entry station which closes a suitably arranged switch, the loaded dolly is removed from the entry station and another empty dolly is delivered to the entry station.

The memory unit 42 enables the garage attendant to punch in a series of requests for cars at a speed faster than the garage 41 can deliver the requested cars at the exit 48. The memory unit stores these requests and causes delivery of the requested dollies to the exit station as fast as the garage can operate. The memory unit is so constructed and interconnected to the detector unit that if signalled by the attendant, the memory and detector units will cause subsequently selected loaded dollies arriving at the exit prior to the first selected dolly to stop their travel to allow removal of the cars therefrom, with the movement automatically continuing thereafter to bring the first selected dolly to the exit. This is referred to hereinafter as "Courtesy Depark" operation.

If there are lines of customers waiting to park as well as depark, the attendant may signal the control unit to park cars as well as "Courtesy Depark" them and this deparking may include "Courtesy Deparking" at the discretion of the attendant. Under this arrangement, each time an empty dolly enters the entry station the dolly movement is interrupted to allow the parking of a car on the empty dolly with the movement thereafter continuing.

Because a complete description of the control system for initiating and controlling movement of the trains of dollies involves an understanding of the construction of the structure housing and supporting the dollies as well as the mechanism for moving them, the latter will be first described herebelow.

*Parking structure*

The parking structure 41 is built in a modular design enabling expansion in three directions. For the purpose of describing the invention only three decks have been shown, only one car width has been shown, and only one internal track tower 91 (FIG. 1) has been shown. Additions to all of these components may be made by merely duplicating the facility in whatever respect required. As will be seen in FIGS. 1 and 2, the garage 41 includes a hoist tower 92 at the exit, a main deck transverse tower 93, a track tower 91, a secondary deck transverse tower 94, and a lowerator tower 95 at the exit. The hoist tower 92 moves dollies therein upwardly in increments of one deck level at a time, the dollies being moved as a single unit by rack and pinion drive means 51. When a dolly has been elevated to the next higher deck, roller brackets 96 are swung out which receive and support the dolly as the rack mechanism 51 descends to return to its bottom position. When the hoist rack means 51 lifts the dollies in the hoist tower upwardly one deck, the entry is cleared, and the main deck transfer tower 93 through chain drive 97 causes movement of the train of dollies on the main deck rearwardly to fill the exit with a dolly. As seen in FIG. 2, the dollies have open-ended angle brackets 98 at their ends which couple the dollies for horizontal movement and enable disengagement of a dolly from a train on vertical movement. The transfer chain drive has a pulling claw 99 which pulls the train rearwardly and also a safety claw 100 which limits forward movement if required. The track tower 91 comprises merely lengths of tracks on which the dollies ride. The secondary deck transfer tower 94 comprises transfer chain drives 101 at each secondary deck level for moving a selected train of dollies forwardly to place the front dolly on the deck in the lowerator 95. Suitable stops 102 are provided at the forward end of the secondary decks for holding the leading dolly in fixed position, the front stop being a pneumatic stop which engages the front of the dolly and the rearward stop being a spring-biased mechanism for engaging the rear of the dolly. Similar stops are provided on the main deck in the transverse movement tower 93.

The lowerator includes a frame 103 which is vertically movable by a self-locking worm gear transmission 104 which requires power to cause the frame to move downwardly as well as upwardly. In the embodiment shown, no dollies are stored in the lowerator; the lowerator merely transfers dollies from a selected secondary deck to the main deck. It is possible, however, to store a dolly at the top deck level in the lowerator shaft if desired. Roller brackets 96 similar to those in the hoist tower are positioned at each deck level in the lowerator tower 95; these brackets 96 receive a dolly from a selected deck and position it for lifting engagement by the lowerator frame 103 so that the roller brackets 96 can be withdrawn to allow downward movement of the loaded lowerator frame 103 to the garage exit.

Figure 9:
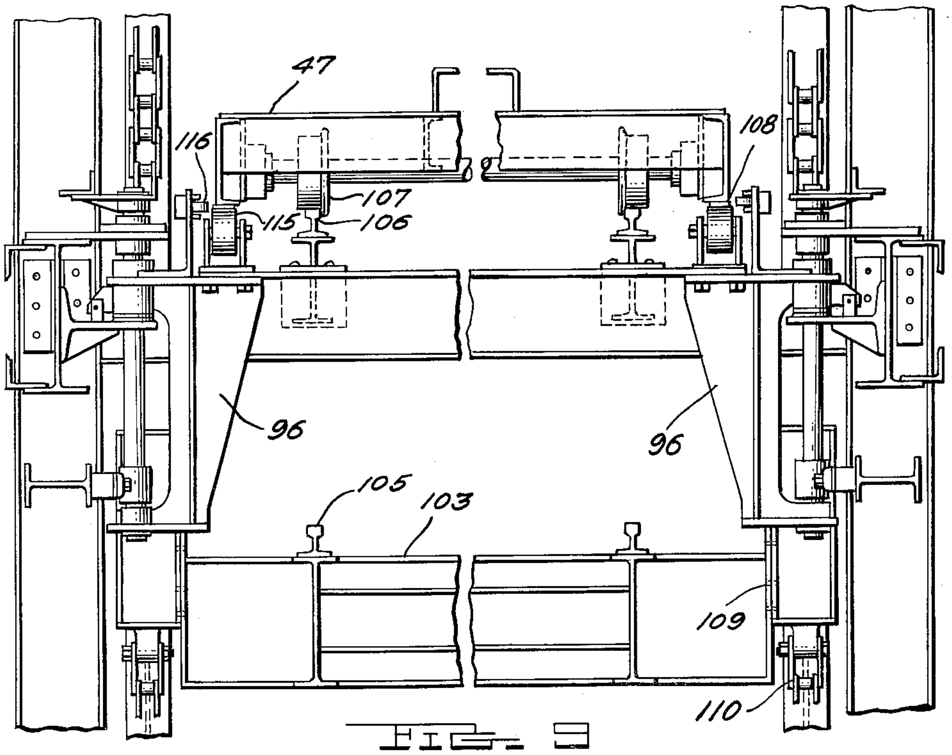
FIG. 9 is an end elevational view of a portion of the lowerator shown approaching a secondary deck.
Figure 10:
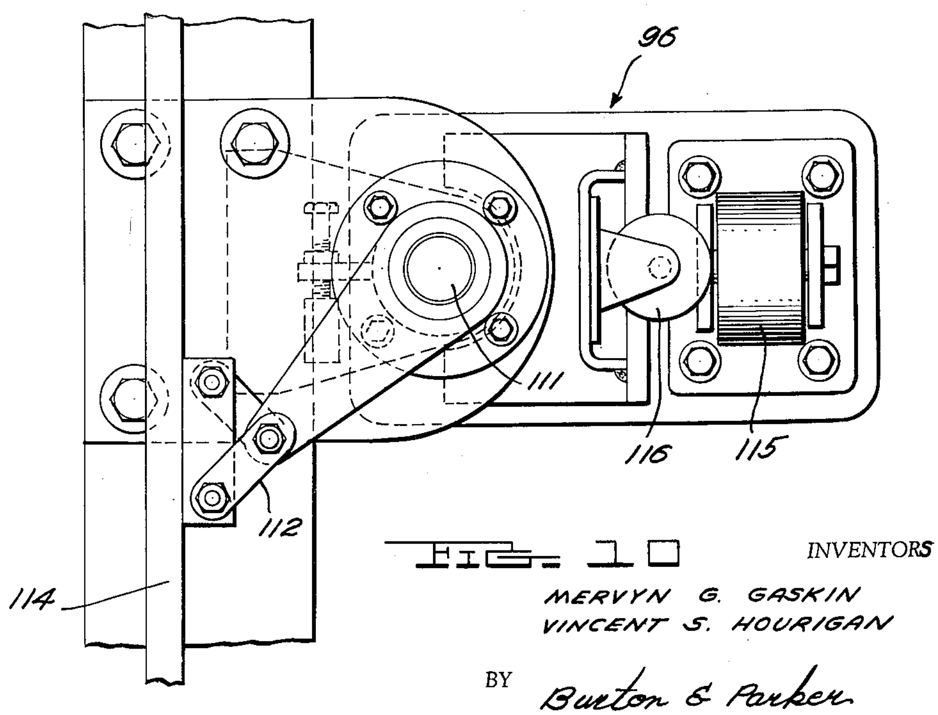
FIG. 10 is a top view of a roller bracket.

Referring now to FIGS. 9 and 10, it will be seen that the lowerator frame 103 has tracks 105 and in the position shown in FIG. 9 is being moved upwardly to engage a dolly 47 positioned on roller brackets 96 in the lowerator tower 95. The tracks 106 immediately under the dolly wheels 107 in this view are the tracks on the selected secondary deck; the wheels 107 are not contacting these tracks 106 as the weight of the dolly 47 is entirely supported by the roller brackets 96 which engage the bottom edge plates 108 of the dolly 47.

The lowerator frame 103 is rigidly mounted at the corners as indicated by numeral 109 to the chain 110 which is powered by the self-locking worm transmissions 104 (FIG. 2). This connection is such that the frame 103 passes upwardly through the space between the roller brackets 96 and engages the wheels 107 on the dolly 47, lifting the dolly from the roller brackets. As seen in FIG. 10, each roller bracket 96 is pivotally mounted for swinging movement into the lowerator shaft and return movement out of the shaft to allow passage of the dolly downwardly to the exit. The roller bracket 96 is pivoted on pin 111 which can be precisely aligned with adjoining roller brackets by means of the three point adjustable linkage system 112. Suitable means, including solenoids 1 and 4, shown in FIG. 15, are provided for actuating slide bar 114 to cause the roller brackets 96 to be swung into the lowerator shaft and out of the lowerator shaft. Each roller bracket 96 has rollers 115 which contact the base 108 of the dolly 47 and side alignment rollers 116 which maintain the dolly in proper alignment for engagement with the frame 103.

Roller brackets are positioned at each deck level in the hoist tower and at each deck level in the lowerator tower. The roller brackets on each side are operated in unison, preferably pneumatically, through slide bar 114, and provide a temporary holding means for the dolly in the lowerator and a storage holding means for a stored dolly in the hoist tower.

Figure 11:
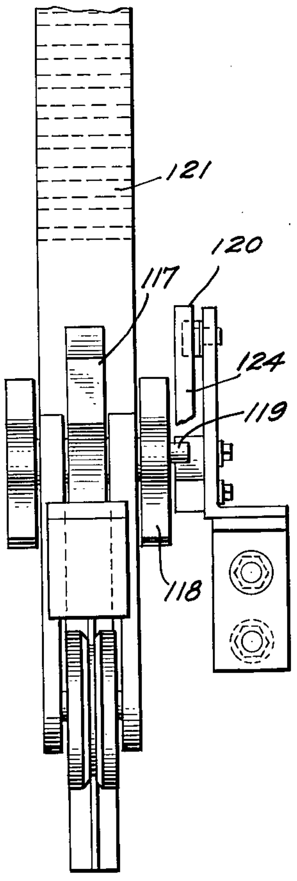
FIG. 11 is a fragmentary end elevational view of a rack and its escapement in the hoist.
Figure 12:
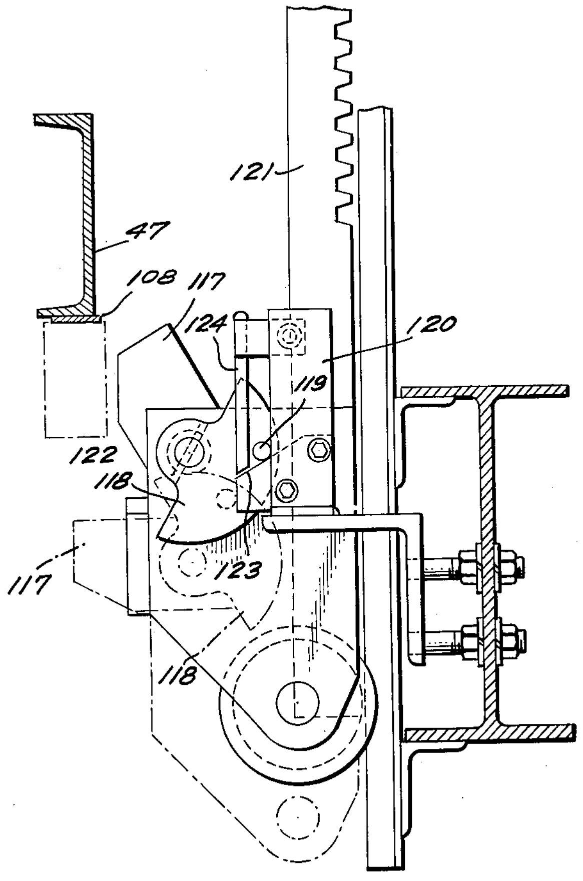
FIG. 12 is a side view of FIG. 11 with a segment of a dolly shown and with the rack bar shown in lifting position in phantom lines.

Referring now to FIGS. 11 and 12, it will be seen that the rack means 121 of the hoist tower 92 which elevates a vertical series of dollies in one deck increments includes a rack bar or dog 117 which has a counterweight 118 which in turn has a pin 119 which passes through an escapement 120 fixed to the garage structure. As the rack 121 is moved downwardly to engage a dolly, the counterweight 118 pivots the dog 117 about shaft 122 so that the dog can pass by the dolly (FIG. 12). Upon reaching the bottom part of its movement, the pin 119 engages cam surface 123 overcoming the counterweight 118 and causing the dog 117 to be pivoted downwardly into the position shown in phantom lines in FIG. 12. A gate 124 is pivotally mounted to allow the pin to pass outwardly along the cam and to prevent its return to the cam surface upon upward movement of the rack. Therefore, upon actuation of the hoist to lift a dolly an increment of one deck, the dog 117 will move upwardly into engagement with the bottom of the dolly 47.

The hoist means 51 in the elevator tower include reversible electric motors schematically indicated at M–4 for transferring dollies between B and C deck levels and M–5 for transferring dollies between the A and B decks. The chain drive means 97 for the A deck train is operated by motor M–3 of FIG. 15, and for the C deck train by motor M–1. Reversible electric motor M–2, see FIG. 15, provides power for operating the lowerator.

*Control System*

The control system has two primary functions, viz.: to bring an empty dolly to the entry station for car parking thereon and to bring the proper loaded dolly to the exit station for deparking a selected car. For either a parking or deparking operation, the facility must go through one or more cycles, a cycle consisting of a one-station index in an operational loop. An operational loop consists of the A deck being in operation with any other one deck, such as with the B deck or with the C deck. The A deck always indexes toward the entry station 49 while the B and C decks index toward the lowerator tower. There are as many operational loops as there are decks above the A deck. It will be noted that the location of any particular dolly is not fixed but will vary during operation of the loops. In other words, the #9 dolly may at one time be on the C deck while at another time may be on the B deck.

During a deparking operation, the control system must determine where a particular car is located in the facility, i.e., where the dolly in which it is stored is located, start the correct operational loop, and stop the dolly when it reaches the exit station. To do this, each dolly has an identification in the control system. The identification may be a number which is given to a customer when parking his car.

During parking the control system must determine where an empty dolly is located and bring the dolly to the entry station. This could be any empty dolly without regard to a particular number identification. In the operation of the facility, the nearest empty dolly from the entry station will be delivered thereto. If there is an empty dolly in the A deck train, it will be delivered to the entry station, or if there is none on the A deck, then from the B deck, etc.

An actual cycle, or any one station index of an operational loop consists of the following, assuming the loop to include the A and B deck trains:

(*a*) The hinged roller brackets 96 are swung out horizontally into the lowerator shaft at the B deck level and the stops 102 are lowered to permit movement of the B deck train.

(*b*) The transfer drive 101 in the B deck indexes the whole dolly train one station to the right as viewed in FIG. 1 to place the #8 dolly at the head of the train in the lowerator shaft on the roller brackets.

(*c*) The lowerator hoist means 104 operates to raise the lowerator up to the B deck level and strip the dolly off the hinged brackets.

(*d*) Thereafter the brackets retract and the dolly is lowered to the bottom of the lowerator and disposed at the exit station. If the car on the dolly is the car to be deparked, it would at this time be driven off the dolly.

(*e*) The elevator hoist means 51 at the B deck level is operated to hoist the leading dolly from the A deck train to the tail position in the B deck train.

(*f*) The A deck transfer means 97 then operates to shift the entire train of dollies on the A deck one dolly length to the left as viewed in FIG. 1 toward the entry station. This completes a full cycle.

The above-described sequential operation would be repeated until the proper loaded dolly arrives at the exit station if the one first delivered does not contain the selected car. For a parking operation, the cycles are repeated until an empty dolly arrives at the entry station. As will be described hereinafter, during a deparking operation the cycle may be interrupted to park a car on an empty dolly passing through the entry station or depark a selected car arriving at the exit station prior to the arrival of the car first selected.

It will become evident hereinafter as the description proceeds that the above sequences are controlled by a push button panel board fully automatically, allowing great flexibility in operation with an economy of dolly movement and with substantial reliability.

The control system, as mentioned hereinbefore, includes a main control panel comprising the main control circuits and housed in the control box 46 at the parking structure. From this panel run the power lines to the motors and other mechanism for actually causing movement of the dollies in the structure. In FIGS. 14–16 is shown an electric schematic diagram of the entire control system, and for purposes of clarity, is shown as operating on one voltage thereby eliminating a great number of power relays. In addition to the main control panel, an automatic call system panel, shown in FIG. 1 at 40, is also provided and includes, as heretofore mentioned, the detector 44 and a memory unit 42. This automatic control system panel is installed in the attendant's office and in addition to containing the push buttons and switches to be operated by the attendant, may also include a visual reference board showing location of the dollies in the facility. This reference board, which is part of the detector, may have small windows therein through which the attendant can view a number associated with a dummy in the detector, such number corresponding to the dolly mated with the particular dummy. In lieu of the aforementioned windows, suitable signal lights or the like might be provided in an obvious fashion. This control system will find a particular dolly, such as a loaded dolly or an empty dolly, and send an input signal to the main control panel to start, stop, or interrupt the cycle.

The memory unit 42 contains numbered push buttons for deparking any selected car. The operator's control panel **42*a* contains a park-depark switch, a park-hold switch, an emergency stop switch, and various signal lights, as well as a courtesy depark switch 69**. The memory unit allows the attendant to punch each customer's car number as the customer presents his claim ticket and handle a backlog of customers in their proper sequence when customers are arriving faster than the machine can deliver the cars to the exit station.

The courtesy depark switch is useful in the following situation. In the event there is a lineup of customers waiting to claim cars and the first customer's car is on the C deck in such a location that four cycles are required to deliver his car to the exit station, and one of the following customers has a car parked on a dolly which will be cycled through the exit station prior to the arrival of the first customer's car, the courtesy depark switch will allow deparking of the subsequent customer's car when it arrives at the exit station. When the courtesy customer leaves the exit station, the original customer's sequence is continued.

During a typical day's operation, and commencing at the beginning of the day, the facility will be completely empty. The operator turns on the park switch. The first customer drives his car onto the empty dolly at the entry station and upon exiting through a "safety gate," a signal is then sent to the detector 44 which seeks out the nearest empty dolly, which of course is the one adjacent the entry station. A signal is thereupon sent to the control box 46 or main control panel, to operate the A and B decks in a cycle to shift the B deck train to the right, lower the B-deck dolly in the lowerator to the exit station, and shift the A deck train to the left to position the empty dolly at the entry station. Because one cycle brings an empty dolly to the entry station, the operation thereupon stops until the second customer drives in and leaves through the safety gate. When the B deck is full, the C deck is signalled to operate as subsequent customers arrive. As each dolly is loaded, a light may operate, if desired, on the control panel, to indicate that a particular dolly has been loaded.

Assuming now that the facility has been partially loaded and customers return to claim their cars, the cashier switches the system to "depark auto" and punches in the first customer's number in the memory unit. A signal is sent from the memory unit to the detector to locate the first customer's car, and the detector in turn, after locating the proper dolly, signals the main control panel in box 46 to cause the A deck train and the secondary train containing the selected dolly to bring the customer's car to the exit station. The operational loop commences and cycles until the car arrives at the exit. In the meantime the attendant punches in the other customers who arrive for their cars, and may, as hereinbefore mentioned, cause a car to be "courtesy deparked" if it should arrive at the exit station prior to the arrival of the first customer's car.

Referring to the schematic diagram of FIG. 13, when the attendant pushes button #9 in the memory unit 42 to depark the car on the #9 dolly, the memory unit signals the detector to locate the #9 dolly. If dolly #9 is on the C deck, as shown in FIG. 1, its mated dummy in the detector will be in row C′ and in the same position in the row as is the dolly position in the C deck train. As the signal enters the detector, it passes to banks of #9 switches at each of the dummy rows. There is a #9 switch at every possible stored position of dummy #9 in the detector and that #9 switch at the position of the #9 dummy is the only #9 switch closed among the various banks of #9 switches. Because the closed switch is in row C′, a signal is sent to the main control circuit that deck C is to be operated, and the main control circuit in turn energizes the parking structure machinery to move the #9 dolly to the exit station by shifting the C deck train.

*The Detector*

Figures 5, 6:
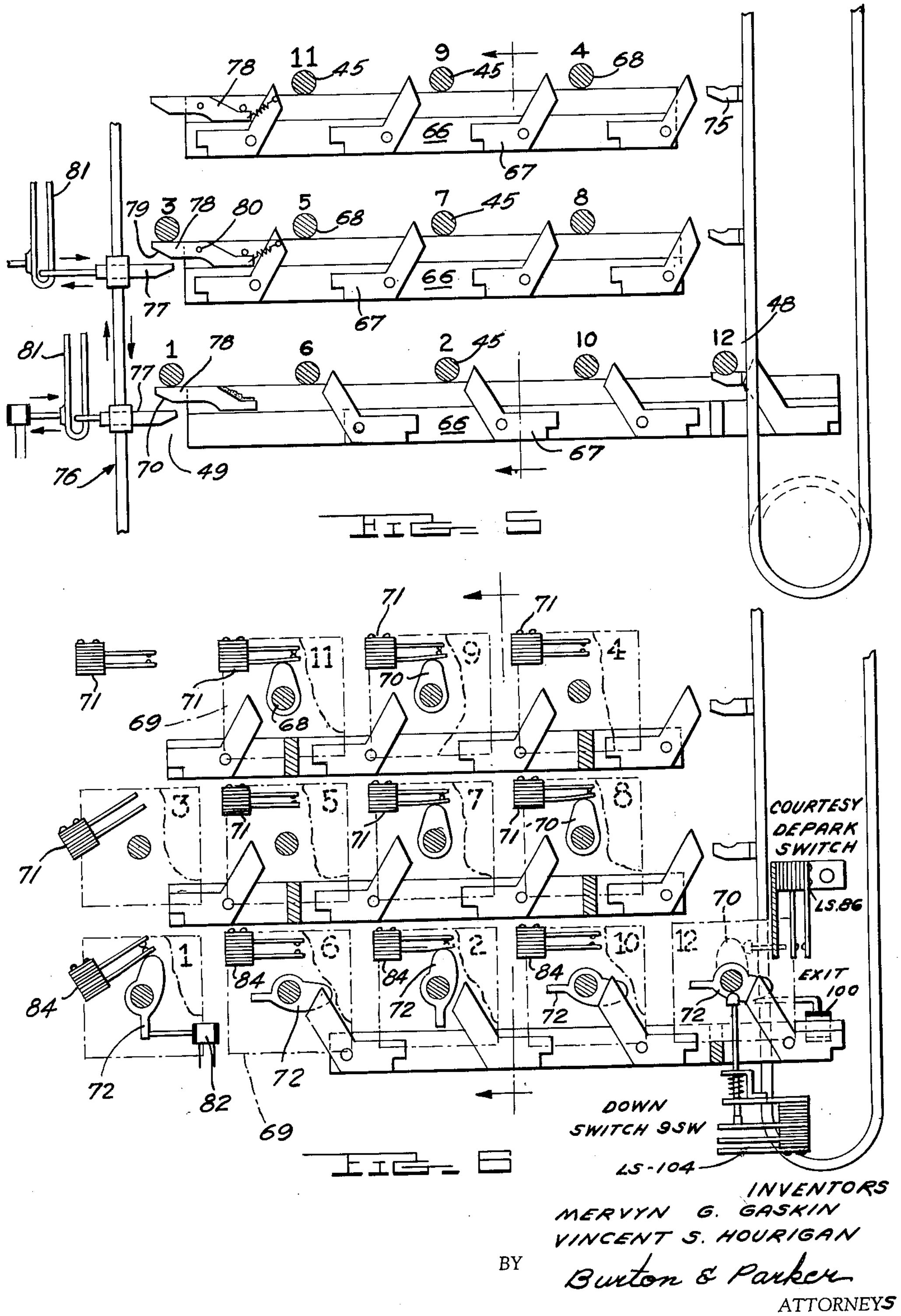
FIG. 5 is a diagrammatic elevational view of the detector.
FIG. 6 is a view similar to FIG. 5 with the cams and switches of the detector shown, this view being taken on a line similar to line 6—6 of FIG. 7.
Figure 7:
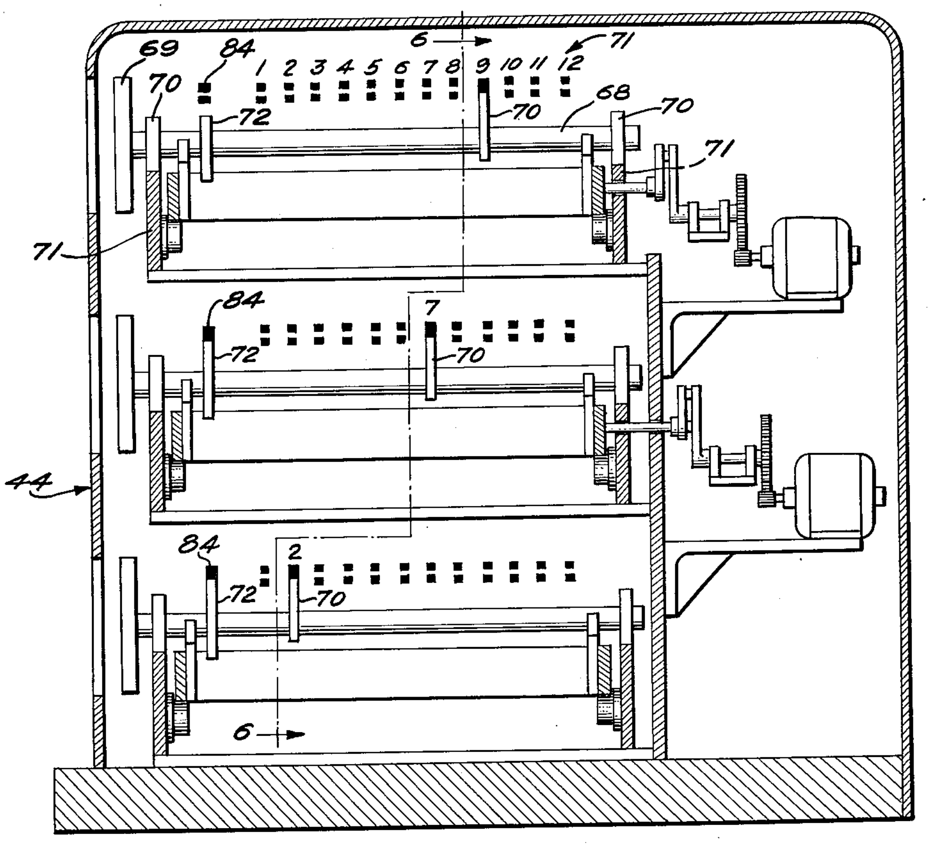
FIG. 7 is an elevational side view of the detector taken on a line through the detector similar to line 7—7 of FIG. 6.

As shown in FIGS. 5–7, as well as schematically in FIG. 14, the detector 44 includes twelve dummies 45 with the #12 dummy at the detector exit position 48. Cycling of the dummies 45 through closed paths or loops may be accomplished by any suitable drive means, but as schematically shown, the dummies 45 are moved forwardly on B′ and C′ rows and rearwardly on the main row A′ by horizontally moving shuttles 66 having counterweighted pivotally mounted pushers 67 which pass under the dummies 45 on the return movement. A dummy, as seen in FIG. 7, comprises a rod 68 having a face plate 69 which carries its identifying number. The number is visible through windows *69a* of panel *69b*. Each rod has square or rectangularly shaped bearing plates 70 rigidly secured to opposite ends thereof which ride on horizontal rails 71 fixedly mounted in the detector 44. The rod 68 of each dummy has two indicia cams. One indicia cam 71′ is for the purpose of closing that switch in each bank of switches *71a* at each possible location of the dummy that corresponds with the particular dummy. In other words, the #9 dummy has an indicia cam 71′ which will close the #9 switch at each position the dummy may assume in the detector. The other indicia cam 72 is for the purpose of indicating whether the dolly corresponding to the particular dummy is in an empty or loaded condition. This latter cam contacts a switch 84 at every position of the dummy corresponding to a stored position of the corresponding dolly in the parking structure. This condition cam 72 is set to indicate a loaded condition by solenoid 101 shown in FIG. 6 and is shifted to indicate an empty condition by solenoid 100.

Figure 14A:
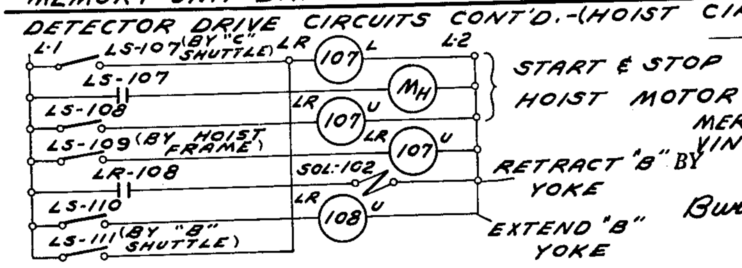

Movement of the dummies horizontally is accomplished by the shuttle 66 which includes, for the C′ row, a motor $M_c$ driving through a crank arrangement, and for the A′ row, a motor $M_a$ driving through a similar crank arrangement. These motors are schematically shown in FIG. 14. Another motor, not shown, is provided for the B′ row. Suitable switches, schematically shown in FIG. 14, and actuated by the shuttle drive completing a full revolution, serve to stop the shuttle. Vertical movement at the exit end of the detector is accomplished by a detector lowerator 74 which receives each dummy rod 68 from the shuttle 66 and lowers the dummy to the exit. Suitable drive means including a motor $M_1$ schematically shown in FIG. 14, drives the lowerator. At the entry of the detector means a hoist means 76 is provided which lifts the dummies in stages of one-row increments. The detector hoist circuit is shown in FIG. 14*a* and includes a motor $M_h$. The hoist bars 77 pass by (without engaging) the spring biased dummy supports 78 and then engage their respective dummies to lift them the height of one row. As a dummy approaches the second row, it engages a slanting surface 79 on the supports 78 causing pivoting of the supports about support pins 80 so that the dummy can pass thereby. The hoist then returns to its bottom position with its bars 77 being moved horizontally by solenoid 102 actuating yoke 81 to ensure clearance of the hoist bars 77 past the dummies at a lower row. The solenoid actuating the yoke means is shown in FIG. 14*a*.

Referring to FIGS. 6 and 7 it will be noted that each condition cam 72, rotatably mounted on its dummy rod 68, is shifted as heretofore mentioned, by the solenoids 101 and 100 to indicate respectively either a loaded or an empty condition. Solenoid 101 causes the condition cam to assume a horizontal position when a car has been loaded on the dolly mated with the particular condition cam's dummy. When a car is driven from the exit station, the solenoid 101 causes the condition cam 72 at the detector exit to be rotated to a vertical position so that it may contact the condition switch 84 at each possible location of a dummy in the detector. The schematic circuit diagram of the switches 84, which indicate an empty or loaded condition of a dolly, is shown in FIG. 14. The condition switches cause a searching of the A′ row and then the B′ row followed by the C′ row for a closed condition switch so that the nearest empty dolly is cycled to the entry. How the condition switch circuit causes cycling of an empty dolly to the entry station is described hereinafter.

It will be appreciated that the dummies can travel faster than the dollies and the mechanism is so designed that the dummies lead the dollies. As each dummy reaches the detector exit, the switches 9–SW and LS–104 shown in FIGS. 6 and 14 cause operation of the detector to pause until the mated dolly reaches the exit station in the parking structure. If the dolly reaching the exit station is the one selected, further movement of the detector is prevented until the car is deparked. If the dolly does not contain the selected car, detector operation will at that point resume.

As shown in FIG. 14 the banks of switches 71′ are arranged in rows corresponding to the rows the dummies assume in the detector and also corresponding to the decks of the parking structure. While only one bank of switches is shown at each row for purposes of clarity, it is to be understood that because twelve dollies are used in the structure shown in FIG. 1, there will be twelve switches in each bank at each possible location of a dummy in each row. A more complete description of the above-mentioned circuits of the detector and its relation to the memory unit and the main control circuits will be set forth hereinafter.

*Memory Unit*

Figures 3, 4:
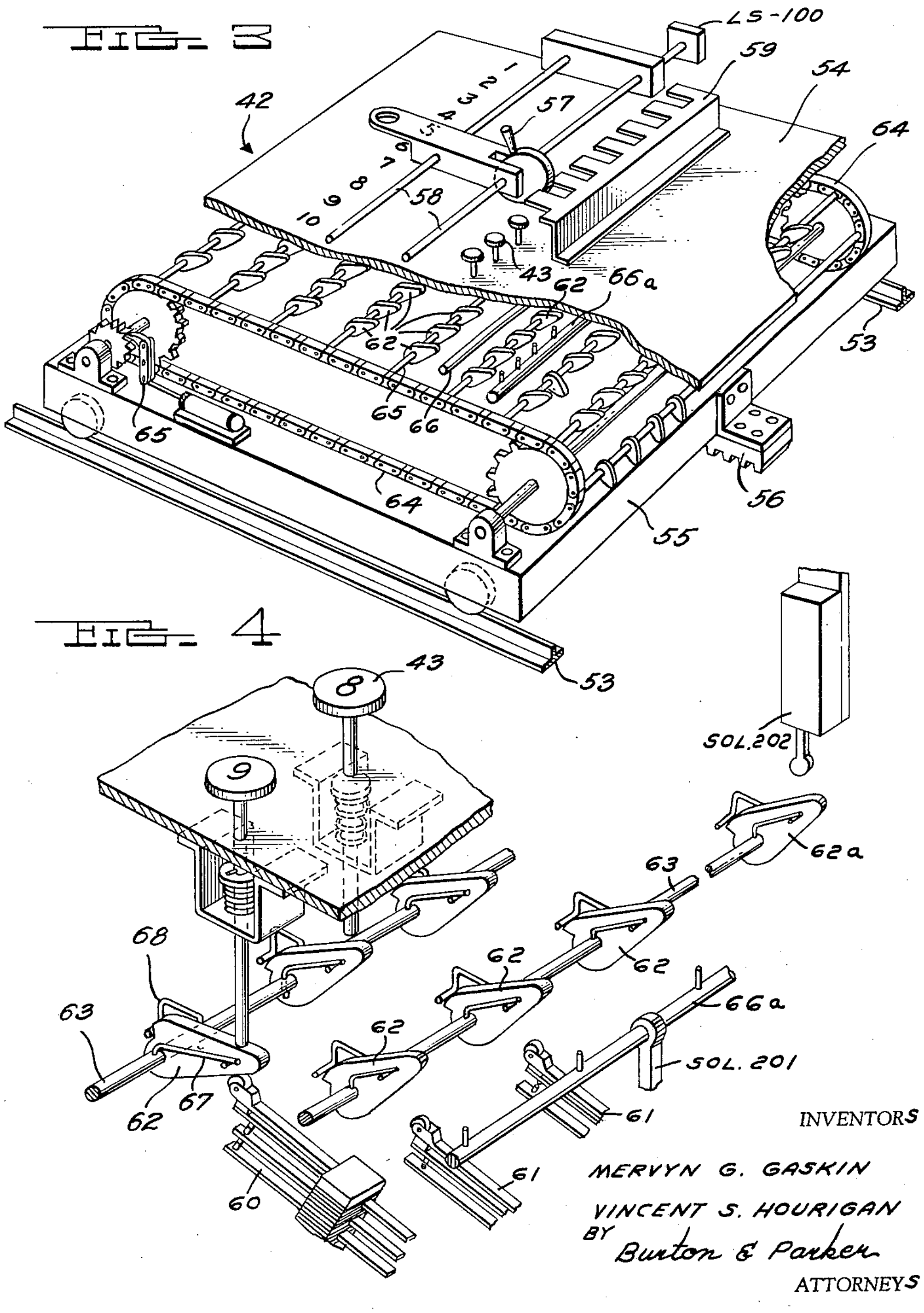
FIG. 3 is a perspective view with parts cut away of the memory unit.
FIG. 4 is a schematic view of a portion of the memory unit.

Referring now to FIGS. 3 and 4, it will be seen that the memory unit 42 includes bottom rails 53 and a fixed top plate 54, which may be the front of the control panel shown in FIG. 1. Mounted for movement on rails 53 and beneath the plate 54 is a carriage 55 which is moved by suitable driving means such as a pinion gear mounted on a reversible motor M schematically shown in FIG. 16, the pinion meshing with the rack 56. The top plate 54 is provided with a series of buttons, corresponding in number to the number of dollies in the parking structure. In the disclosure shown in FIG. 1, there are twelve dollies and therefore twelve buttons 43 are shown in FIG. 3 for the twelve dummies in the detector. An operator's button actuator 57 is provided which can be slid transversely on rods 58 and 58*a* into alignment with a desired button 43; the shield 59 ensures alignment of the actuator 57 and protects the buttons 43. The actuator 57 is mounted on rod 58*a* not only for slidable movement therealong but also serves to rotate rod 58*a* upon rotation of the actuator. Rod 58*a* is connected to a switch LS–200 shown in FIGS. 3 and 16.

Mounted on the carriage is a main bank of switches 60. Also mounted on the carriage is a second bank of "courtesy switches" 61 which enable the attendant to interrupt the cycling to allow deparking of a selected car if such car should reach the exit station during the normal procedure of bringing a previously selected car to the exit station. The main bank of switches 60 includes a separate switch for each dummy-dolly combination and therefore there is one such switch for each of the buttons 43. There are also an equal number of courtesy deparking switches 61. Both the main switches 60 and the courtesy deparking switches 61 are connected to the main control circuit while main switches 60 are also connected to pass signals to the detector. The #9 button when pressed extends its stem below plate 54 a distance sufficient to trip the #9 lug 62. There are a plurality of these lugs distributed along a series of rods 63 carried by a chain 64 entrained over sprockets mounted on shafts as shown in FIG. 3. There is a lug 62 for each dummy-dolly combination as well as an extra lug which is hereinafter referred to as a "common lug." One of such common lugs is indicated at 62*a* in FIG. 3. The lugs are mounted on rods 73 for rotation thereon. The conveyor chain 64 is intermittently driven by a solenoid ratchet means 200 also shown in FIG. 16. The tripped #9 lug is moved from a position beneath the #9 button either upon a movement of carriage 55 or upon a combination of carriage movement and actuation of solenoid 200.

The buttons 43 may be spring-loaded to return after the actuator 57 has been swung back to its starting position. Lugs 62 are held either in their tripped or normal positions by springs 67 and 68. Spring 67 is mounted fixedly on the rod 63 to engage beneath a pin extending laterally from the lug with the end of spring 67 capable of snapping from below to a position above the pin when the lug is depressed by the buttons as shown in FIG. 4. Spring 68 also fixed on rod 63 acts against the lug to hold it in its untripped position. A fixed clearing bar 66 is supported by carriage 55 and returns the tripped lugs to their untripped position. A movable courtesy lug clearing bar 66*a* actuated by solenoid 201 serves to clear lugs which have been tripped and which have already closed the courtesy depark switches to effect a courtesy deparking of cars. These latter lugs are cleared to prevent them from thereafter engaging the main switches 60 and causing unnecessary cycling of the machine.

Figure 8:
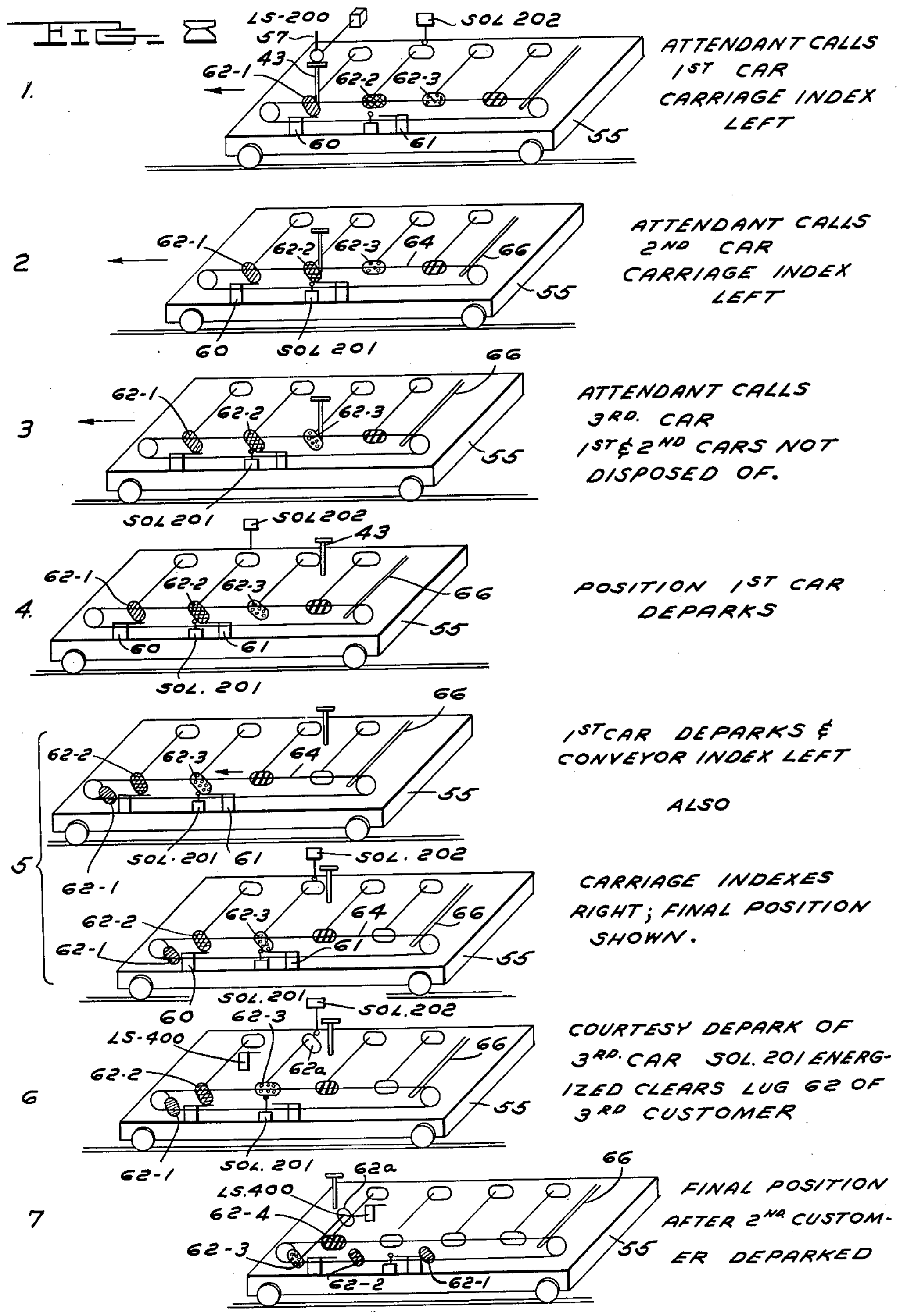

Whenever any button 43 of the memory unit is depressed by the actuator 57 being rotated, because the actuator is keyed to rod 58*a* to cause rotation thereof, switch LS–200 is closed, which energizes latch relay LRX shown in FIG. 16. The circuit of FIG. 16, as are the circuits of FIGS. 14, 14*a*, and 15, is powered through conductors L–1 and L–2. When latch relay LRX is energized, it serves to start the carrier motor M to shift the carriage 55 one station to the left or, in other words, from the position shown in FIG. 8–1 to the position shown in FIG. 8–2, to cause a fresh row of lugs 62 to be presented beneath the buttons 43. FIG. 8, which is a schematic representation of the carriage, the conveyor 64 and relationship between the lugs 62, the main bank of switches 60, etc., shows lug 62–1 in a tripped position at FIG. 8–1 following depression of the buttons to punch in the first customer who calls for his car. If another customer arrives before the first one is disposed of, upon depressing the numbered button corresponding to the second customer's car, a lug 62–2 is tripped and LS–200 causes the carriage to again index to the left as above described. This again presents a fresh row of lugs below the buttons as the carriage moves from the position of FIG. 8–2 to that of FIG. 8–3. If still another customer arrives before the first one is disposed of, upon pushing the proper button 43, the lug 62–3 is tripped and the carriage once again indexes to the left or, in other words, from the position shown in FIG. 8–3 to that shown in FIG. 8–4. During the punching of the buttons for the second and third customers, viz: 62–2 and 62–3, lug 62–1 remains in contact with its corresponding switch in the bank of switches 60 mounted on the carriage. LS–201 is closed by the carriage drive moving one station to the left and this unlatches relay LRX to stop the carriage drive motor M.

Assuming now that the first customer departs, a signal is received from the main control unit by a conductor 500 to energize solenoid 200 (see FIG. 16). Solenoid 200 in turn causes the conveyor 64 to index counterclockwise one station and in so doing lug 62–2 is moved into contact with its corresponding switch in the bank of switches 60. The same signal received along conductor 500 latches relay LRY and starts the carriage drive motor M in reverse to cause the carriage to index one station to the right. LS–202 closed by the carriage drive serves to unlatch relay LRY and stop the carriage motor. These two carriage operations are shown in FIG. 8–5. In the final position shown in FIG. 8–5 it will be noted that lug 62–2 is in contact with its associated switch in the bank of switches 60 and that lug 62–3 is in contact with one of the courtesy switches in the bank of switches 61. It will also be observed that the carriage has indexed back to the same relative position as that shown in FIG. 8–3 so that a fresh row of lugs 62 is now disposed beneath the buttons 43.

Assume now that the dummy for customer #3 reaches the exit position in the detector before the dummy for customer #2 and that the courtesy stop switch LS–86, shown in FIGS. 6 and 14, is tripped momentarily closed as the dummy passes by. Cycling in the main unit is interrupted as a result of the closure of LS–86 allowing customer #3 to depark. Also a signal is sent to the memory unit circuits by a conductor 502 which causes relay LRZ to be latched preventing a signal which will come from the main unit as customer #3 drives his car from the exit station, from indexing of the conveyor 64 thereby effecting a removal of lug 62–2 from the main bank of switches 60. Solenoid 201 is also energized by the signal from the detector to clear the #3 lug, and solenoid 202, mounted on the carriage, is energized to set the common lug 62*a*, whose function is hereinafter described. Lug 62*a* is mounted on each of the rods 63 to rotate thereupon as are the lugs 62.

Following the above operation, the car of customer #2 is deparked and when the signal is received from the main unit, relay LRZ is unlatched and solenoid 200 is energized to index the conveyor one step counterclockwise. Relay LRY is latched to index the carriage one step to the right. As the conveyor indexes to the left, the common lug 62*a* is moved into contact with switch LS–400 mounted on the carriage, closing LS–400, and this again latches LRY to index the carriage once again to the right. These movements are shown in FIGS. 8–6 and 8–7, the latter indicating the final position of the relative parts. In the final position, it will be noted that the lugs, carriage, and conveyor are now back to the starting positions. Of course lugs 62–1 and 62–2, which were tripped by the attendant in calling for the cars of customers #1 and #2, will be returned to their untripped positions when the conveyor 64 has indexed a sufficient number of times to carry such lugs across the clearing bar 66.

*Main Control Circuits*

The main control circuits, or what might be termed power circuits, which serve to power the parking mechanism in order to move the dollies, are shown schematically in FIG. 15. As heretofore mentioned, the conductor 500 connects the main control circuits to the memory unit drive to indicate to the memory unit when a car has been deparked so that the conveyor and carriage may be indexed accordingly. In addition to conductors L–1 and L–2, which supply power to the main control circuits, conductors 508, 510, 512, 514, and 516 send signals to the main circuits, as hereinafter mentioned, from the detector and memory unit circuits. Conductors 518, 520, and 522 signal the detector as hereinafter mentioned.

Unless heretofore specificially mentioned, the various switches shown in FIG. 15 and closed by dolly movement, elevator movement, lowerator movement, dolly stops etc., will, it is to be understood, be positioned so that they are properly actuated by that portion of the mechanism of the parking structure indicated as actuating the same. Those skilled in the art will understand where the various switches may be placed in order for the same to be properly actuated as the various mechanisms in the parking structure operate.

The main control circuit of FIG. 15 can be best described in terms of operation of the parking facility to depark, park, and perform a combination of parking and deparking operations. At the outset it will be understood that continuous trains of dollies fill each of the decks and there is a dolly at each deck level in the elevator. In a deparking operation, and assuming that the attendant has requested the delivery of #4 dolly (see FIG. 1) and the detector has located the selected dolly as residing in the C deck train, it sends a signal along conductor 508 to the main control circuit. This signal latches relays LR–1 and LR–2. Relay LR–1 activates the C deck circuits and LR–2 closes a repeating switch LR–2. Upon closure of relay switch LR–1, solenoid 1 is energized. This solenoid is connected to a fluid pressure valve which powers a fluid pressure motor causing the roller brackets 96 at the C deck level in the lowerator shaft to swing out to a position to receive the #12 dolly as shown in FIG. 1. When the roller brackets swing out, they close switch LS–1 and cause energization of solenoid 2. This solenoid is also associated with a fluid pressure valve which controls movement of a fluid pressure motor to cause the stops 102 of the C deck to be lowered, thereby allowing movement of the C deck train.

As stops 102 are lowered they close switch LS–2 to start transfer motor M–1 at the C deck causing the C deck train to index one dolly length to the right to place the #12 dolly in the lowerator shaft on the roller bracket and withdraw dolly 11 from the elevator. As the dollies move forward on the C deck, one of them closes switch LS–3, which in turn energizes relay CR–3 to stop transfer motor M–1. As the transfer motor is de-energized, the dollies come to a stop and in so doing, close LS–4, which serves to energize CR–4 and solenoid 3. Solenoid 3 shifts the valve controlling the movement of the dolly stops 102, raising the stops to prevent further movement of the C deck dolly train. It will also be noted that solenoid #2 is de-energized.

As dolly #12 enters the lowerator shaft on the roller bracket, it also closes LS–5 to start the lowerator motor M–2 to raise the lowerator. As the lowerator ascends, it closes LS–6 latching in relay LR–5 and then closes LS–7 to stop the motor. The lowerator coasts up to a position engaging dolly #12 on the roller brackets and at this point closes LS–8 which serves to re-start motor M–1 with a high torque to jog the dolly upwardly off the roller brackets. Slight upward movement of the lowerator at this point closes LS–9 to again stop motor M–1. LS–10 is also actuated. The dolly is now clear of the roller brackets and LS–5 is all this while held closed.

With LS–10 actuated, solenoid #1 is de-energized and the roller brackets are retracted inwardly from the lowerator shaft to allow descent of the dolly. The roller brackets are retracted by energization of solenoid #4. As the roller brackets retract, they close LS–11 starting the lowerator motor M–2 to lower the lowerator. When dolly #11 was withdrawn from the elevator it closed LS–22 in turn energizing solenoid 7 and causing the roller brackets 96 at the C-deck level in the elevator shaft to retract. Upon retraction the brackets closed LS–23 (see FIG. 15) which started elevator motor M–4 to raise dolly #3 from the tail of the B-deck train to the tail of the C-deck train. As the elevator neared its upper limit of travel it actuated switches LS–24 and LS–25 to stop the elevator motor and energize solenoid 8 to cause the roller brackets 96 to be extended beneath the dolly. Upon extension of the brackets they closed LS–25 causing the elevator motor M–4 to reverse its operation and lower the elevator to the B-deck level.

At the same time, dolly 3 in being raised from the B-deck to the C-deck has closed LS–28 which has energized solenoid 9 causing retraction of the roller brackets 96 at the B-deck level in the elevator. As these brackets retract they close LS–29 which energizes M–5 to raise the A—B deck elevator to lift dolly #1 from the head of the A-deck train to the tail of the B-deck train. As the elevator nears the upper limit of travel it actuates double-throw switch LS–30—LS–32 to stop the lowerator and cause roller brackets 96 at the B-deck level of the elevator to extend. As the brackets extend they close LS–31 which reverses elevator motor M–5 to lower the elevator and set dolly #1 on the brackets.

Both of the above described elevator movements occur as the lowerator is carrying dolly #12 down to the exit. As the lowerator descends, it closes LS–12 to unlatch relay LR–1 and then sequentially closes LS–18 and LS–**18*a*. It also opens LS–13 to stop the lowerator motor just prior to the lowerator bottoming. LS–18*a* sends a signal to the detector via conductor 518** to start the shuttle motor $M_a$ of the detector to cause the dummies in row A' to shift one station to the left.

As the lowerator bottoms, it closes switch LS–14 which will energize solenoid 5 to lower the stops 102 permitting movement of the A-deck train. As the stops come down they close LS–15 to start the main deck transfer motor M–3. As the dollies in the A-deck train move toward the entry station, they close LS–16 to energize relay CR–6 and stop the transfer motor after they have moved one dolly length toward the entry station. At the same time that LS–16 is closed, LS–17 is closed to energize solenoid 6 to cause the stops in the A-deck to rise and trap the dollies against further movement. One complete cycle in an operational loop of the A and C decks has now been completed.

Dolly #4, the selected dolly, is now at the head of the C-deck train and next to be brought to the exit station. As dolly #6 in the A-deck train enters the foot of the elevator shaft, it closes LS–20 which feeds back into relay LR–1 through switch LR–2 and causes an automatic repetition of the cycle above described to the point of delivery of the #4 dolly to the exit.

Before the lowerator with dolly #4 reaches the exit station, the mated dummy in the detector unit has reached its exit and actuated the #4 depark switch in the bank 9–SW (see FIG. 14), which in turn sends a depark signal to the main circuit as far as LS–18. When the lowerator bottoms and trips closed LS–18, this serves to unlatch relays LR–5 and LR–2. With LR–5 unlatched, its slave switch LR–5 in series with LS–**18*a*** is opened and prevents operation of the detector shuttle motor $M_a$ thereby preventing the dummies in row A′ of the detector from being shifted. With LR–2 unlatched, its slave switch in series with LS–20 and LR–7 will prevent recycling of the parking structure until a car is departed from dolly #4. As the car is deparked it closes the depark switch DP, which serves to latch relay LR–5 and permit the shuttle motor for the A′ row in the detector to operate. In addition, with LR–5 latched, the A deck train will be shifted one dolly length to the left to clear the bottom of the lowerator. With relay LR–2 unlatched, a dolly entering the elevator and closing LS–20 does not cause the cycle to repeat.

The deparking of a car from a dolly on the B deck can be accomplished in a similar fashion to that described.

In parking a car, and assuming the closest empty dolly is on the C deck as determined by the detector, the detector signals the control circuits for the C deck, and the empty dolly on the C deck is cycled to the entry station in the manner above described for a typical operational loop. When the empty dolly enters the entry station at the head of the A-deck train and closes LS–19, it unlatches relay LR–2 preventing further recycling of the main control circuit. The signal unlatching LR–2 is fed into the main control circuit through conductor 514, originating in the detector, as is hereinafter described. When the dolly is loaded, and the customer leaves through the "safety gate," LS–21 is closed, unlatching relay LR–7 and in turn closing the slave switch LR–7 in series with switch LR–2 to permit further cycling of the machine upon the receipt of the signal from the detector.

In combination parking and deparking sequence, a deparking of a selected dolly is temporarily interrupted when an empty dolly is at the entry station and parking is desired. A "park-hold" signal from the operator latches relay LR–7 via conductor 516, which breaks the repeating circuit from relay LR–2 without unlatching LR–2. When the car is parked, closing of LS–21 by the safety gate unlatches relay LR–7 and restores the repeating circuit. Of course LS–20 has already been closed by a dolly in entering the bottom of the elevator.

*Detector Circuits' Operation*

In FIG. 14 is shown a schematic representation of the detector circuits as well as the detector drive circuits. Three rows of switch banks 71′ are shown, and as mentioned hereinbefore there is one switch for every dummy at every position that a dummy may assume in the operational loops through the detector. In addition there is a condition switch 84 at each position that a dummy may assume in the operational loops through the detector. There is also a parking switch LSP at the detector "entry" position which, in addition to performing the function of a condition switch 84, also acts as hereinafter described. It will also be observed in FIG. 14 that there is an off-on switch, a combination double-pole single-throw "park auto" and "depark auto" switch 52, a "courtesy depark" switch, and a "park hold" switch connected as shown. Only the memory unit keyboard is shown in FIG. 14, it being understood that by throwing the "courtesy depark" switch to the On position, a signal may pass from conductor 530 emanating from the banks of courtesy switches 61 in the memory unit. In the event the courtesy depark switch is in the Off position, the only signal received from the memory unit will be from the main bank of switches via conductors 532 and 534.

A stop switch 9–SW shown in FIGS. 4 and 14 is representative of a bank of such switches, one for each dummy, and each switch being closed by only one of the dummies. Each of these switches has a conductor 510 leading to LS–18.

Assuming that it is desired to depark a vehicle on the #9 dolly, and with the Off-On switch turned On, and because it may be desired to courtesy depark autos with the "courtesy depark" switch On, and with switch 52 turned to the "depark auto" position, a signal is sent from the memory unit via conductor 534 to the switches 71′ as the attendant presses the #9 button of the keyboard on the memory unit. Dummy #9 is present in the C′ row and is holding closed its respective switch 71′. As a result, a signal can pass via conductor 508 to latch relay LR–1 in the main control circuits for the C deck as shown in FIG. 15. Of course it is to be understood that there is a conductor similar to 508 from the circuit of the B′ row to the control circuit for the B deck. In addition to signalling the main control circuit, dummy #9 through its switch 71′ also latches relay LR–102 to start the motor driving the C′ row shuttle, motor $M_c$. The #9 circuit is also made as far as the #9 switch in the stop switch bank 9–SW.

With the C shuttle moving forward, it closes LS–101 in the detector drive circuit latching relay LR–103 and thereby breaking the signal to the main unit. However, the main unit continues to operate. During further travel the C shuttle closes LS–103 to unlatch relay LR–103 to stop the C shuttle motor, and this also latches relay LR–104 to prevent the C shuttle from repeating its cycle at this time and to latch LR–105 to start the detector lowerator down.

As the detector lowerator moves down it closes LS–104 to unlatch relay LR–105 and stop the lowerator. The detector now waits for a signal from the main unit that the main lowerator is down, such signal coming from the closing of switch LS–18*a*.

A signal from switch LS–18*a* that the lowerator in the main structure is down latches relay LR–106 to start the A shuttle motor $M_a$. As the A shuttle moves, it closes LS–105 to unlatch relay LR–106 to stop the A shuttle motor and also unlatch relay LR–104 to allow the C shuttle motor to operate to move the dummies in the C′ row.

When the cycling has continued sufficiently long, both in the detector and in the parking structure, so that the #9 dolly is starting down the lowerator toward the exit, the #9 dummy preceding it will close its respective stop switch in the bank 9–SW, energize relay CR–107, and set up switch LS–18 in the main control circuit. When the lowerator in the parking structure bottoms and closes LS–18, the A deck is de-activated pending deparking of the vehicle on the #9 dolly now at the exit station. The repeating relay LR–2 is also unlatched. As the vehicle leaves the #9 dolly, it actuates the depark switch DP to re-activate the A deck. The car also closes LS–50 to send a signal to the detector circuits to start the A shuttle motor as before and the same signal to the memory unit drive via conductor 500 operates solenoid 200 in the memory unit drive to index the conveyor one station counterclockwise in the fashion hereinbefore mentioned. Operation of solenoid 200 also serves to close LS–106 in the detector drive circuit of FIG. 14 to unlatch relay LR–103 to make ready for sending a new input signal to the main control circuits. Closing of stop switch 9–SW also serves to mark the dummy empty as a result of the energization of solenoid 100.

The above steps constitute a normal deparking sequence. In the case of a courtesy depark, the bank of stop switches LS–86, in which there is one switch for each dummy, is closed by a "courtesy dummy" arriving at the detector "exit." The bank of LS–86 switches is represented in FIG. 14 as just one switch. Upon closing of LS–86 by a "courtesy dummy," a signal is sent via conductor 512 to latch relay LR–8. This will prevent the A deck from operating without the necessity of unlatching the repeating relay LR–2. As the vehicle leaves the dolly, it closes LS–51 which unlatches relay LR–8 to allow the A deck to operate. While the depark switch DP is tripped, it does not serve any function. LS–50 is also tripped by the vehicle leaving the exit station and sends a signal to the detector drive circuits as before. The closing of LS–51 serves to signal the memory unit drive via conductor 500, to effect operation of the memory unit drive as before mentioned. However, the signal to the memory unit drive does not cause the conveyor to index, but instead the lug 62 is cleared by the solenoid 201 as described in connection with the memory unit drive circuits.

In the parking of a vehicle, the attendant turns the feeder switch to "park auto." The detector condition switches 84 indicate an empty dolly located on C deck and therefore power is fed to the main control circuits and the detector drive circuits as heretofore described for deparking of a vehicle. The cycling continues until the "empty dummy" is moved into the position corresponding to the entry where switch LSP is closed by the condition cam 72. Upon closure of LSP a signal is sent to the main unit via conductors 514 and 516. After parking of a vehicle on the dolly and upon closing of the safety gate, LS–21 is closed, sending a signal to the detector, energizing solenoid 101 to mark the dummy loaded, which causes switch LSP to drop down again and the searching recommences for another "empty dummy."

In the event it is desired to both park and depark at the same time, the feeder switch is turned to "depark auto" and the park hold switch is turned On, which energizes relay CR–101 to allow only a "park hold" signal to go to the main control circuits via conductor 516.

What we claim is:

1. Apparatus for storing cars or the like on dollies comprising a control unit and a dolly storage structure, said control unit including a detector having dummies in parallel longitudinal rows, one row being a main row and the other rows being secondary rows, the rear end of the main row defining an entry, an exit being defined adjacent the front end of said main row, detector cycling means for cycling in a closed loop the dummies located ina selected secondary row, the main row and the rear end of any rows therebetween, said detector cycling means cycling said loop forwardly along the selected secondary row then transversely to said exit and transversely from said entry to said secondary row and then rearwardly along the main row, each dummy having its own index means for identification, readers along said rows positioned in fixed locations adjacent the stopped positions of the dummies and in the line of travel of the index means, each reader having a bank of switches positioned for identifynig engagement by said index means, control circuits connected to said bank of switches for conducting control signals therefrom, said storage structure having an entry and an exit and trains of dollies equal in number and spacial pattern to the rows of dummies in said detector whereby each dummy is mated to the dolly in its duplicated location, storage structure cycling means connected to said control circuits and responsive to said signals for cycling said dollies in a selected closed loop similar to said detector past said storage facility entry and exit.

2. Apparatus in accordance with claim 1 and wherein said detector includes switch means temporarily interrupting detector cycling as each dummy reaches the exit, said storage cycling means including means for producing an exit signal when the mated dolly to the dummy in the detector exit arrives at the storage exit, said detector cycling means including means responsive to said exit signal to re-establish cycling of the dummies.

3. Apparatus in accordance with claim 2 and wherein said detector includes a depark reader in fixed location at said detector exit, means for setting the depark reader to read the index means of a selected dummy and produce a depark signal when engaged by the selected dummy, said storage cycling means including means responsive to said depark signal to interrupt the cycling of said dollies when the mated dolly to the selected dummy arrives at the storage exit.

4. Apparatus in accordance with claim 3 and wherein said control unit includes an operator's keyboard having a depark button for each dummy, said buttons being electrically connected to said detector at said readers and at said depark reader to initiate cycling of said dummies and said dollies upon receipt of a request signal from a selected button, said depark reader being set by the request signal to read the index means of the selected dummy and interrupt the cycling when the selected dolly arrives at the garage exit.

5. Apparatus in accordance with claim 4 and wherein said control unit includes a memory means actuatable by the depark buttons and including means for storing a sequence of depark button actuations, said memory means being positioned between said buttons and said detector and including feeding means for sequentially feeding a stored sequence of signals to said detector in response to the end of the cycling of the detector and garage.

6. Apparatus for storing cars or the like on dollies, comprising at least three vertically spaced longitudinally extending decks arranged parallel to each other, one of the decks defining a main deck and the other decks being secondary decks, storage hoist means extending vertically adjacent the rear ends of the decks, said hoist means having an entry for cars or the like adjacent said main deck and having means for supporting dollies at all deck levels, lowerator means extending vertically adjacent the front end of the decks, said lowerator means having an exit for cars or the like adjacent said main deck, a train of dollies when stored extending along the full length of each deck and into its respective level of said hoist means, the dollies in said hoist means being releasably engaged with the dollies in the decks at the vertical juncture of the hoist means with the decks, secondary transfer means for moving a train on a selected secondary deck level to move the rear end of the train out of the hoist means and the forward end of the train into the lowerator means, the dollies on the deck and lowerator being releasably engaged at the vertical juncture of the elevator with the decks, said lowerator means having means for vertically moving the dolly to the main deck, said dolly becoming releasably engaged with the train on the main deck upon arrival thereat, said hoist means having means for vertically moving the dolly or dollies positioned therein from the entry to the selected deck a single deck distance to empty the entry and fill the hoist means at the selected deck, main transfer means for moving the train of dollies at the main deck level toward the entry to fill the entry and empty the exit, a control system coupled to said hoist means, lowerator means, and main and secondary transfer means, said system including instruction-receiving means for receiving requests for dollies and dolly-locating means responsive to an output of the receiving means to locate the train containing the requested dolly to cause cycling of such train with the main train to move the selected dolly toward the exit or entry, and said system responsive to the arrival of a selected dolly at the exit or entry to interrupt cycling of the trains.

7. Apparatus for storing and handling load-carrying dollies comprising: a structure housing at least three horizontal vertically spaced-apart dolly supporting decks, that deck at ground level designated a main deck and the remainder as secondary decks, a continuous train of dollies filling each deck, a first hoist means at one end of the structure operable to transfer a dolly from a position adjacent the end of any secondary deck to a position adjacent the end of the main deck, a second hoist means at the opposite end of the structure to transfer a dolly from adjacent the end of the main deck level to adjacent the end of any of the secondary deck levels, shifting means at each deck level for moving the dollies on the secondary decks toward the first hoist means and for shifting the dollies on the main deck toward the second hoist means, a dolly supported by the second hoist means at each deck level while the secondary and main decks are each filled with continuous trains of dollies, control means coupled with both hoist means and with the shifting means of each deck to cycle the main deck train in a closed loop path with any one selected train on a secondary deck, said control means responsive to a request for a selected dolly to locate that deck containing the selected dolly and cycle the train on such deck with the train on the main deck to bring the selected dolly to the main deck, and said control means responsive to the arrival of the selected dolly at the main deck to interrupt the cycling.

8. A control system for a dolly storage facility containing spaced-apart parallel trains of dollies with one designated a primary train and the remainder secondary trains and having a load-handling station adjacent the primary train with mechanism successively cycling the primary train through a closed loop path with any one of the secondary trains to present selected dollies in the secondary trains at the load-handling station, comprising: means for receiving successive requests for dollies, means responsive to an output of the first means requesting a selected dolly to locate the secondary train containing the selected dolly and coupled with said mechanism of the storage facility to initiate cycling of the primary train with the secondary train containing the selected dolly, and the second-mentioned means responsive to the arrival of the selected dolly at the load-handling station to interrupt operation of the said mechanism.

9. Apparatus for handling load-carrying dollies comprising: a structure housing a plurality of parallel spaced-apart trains of dollies with one train designated a primary train and the remainder secondary trains, a load-handling station adjacent the primary train, dolly-moving mechanism in the structure for cycling the main train in a closed loop path with any one of the secondary trains to present a selected dolly in the loop at the load-handling station, a control system coupled with said mechanism to control operation thereof, said system including means for receiving a request for a selected dolly and means for locating the position of the requested dolly and causing operation of said mechanism to cycle the primary train with that secondary train containing the selected dolly through a closed loop path, and said control system responsive to the arrival of the selected dolly at the load-handling station to interrupt operation of said mechanism.

10. Apparatus for handling load-carrying dollies comprising: a structure housing a plurality of parallel spaced-apart trains of dollies with one train designated a primary train and the remainder secondary trains, a load-handling station adjacent the primary train, dolly-moving mechanism in the structure for cycling the main train in a closed loop path with any one of the secondary trains to present a selected dolly in the loop at the load-handling station, an input unit for receiving dolly requests, a detector unit responsive to signals from the input unit to locate the position of a selected dolly among the trains in the structure and coupled with said mechanism to operate the same, said detector responsive to the presentation of the selected dolly at the load-handling station to interrupt operation of said mechanism.

References Cited in the file of this patent

UNITED STATES PATENTS

| | | |
|---|---|---|
| 2,095,151 | O'Connor et al. | Oct. 5, 1937 |
| 2,186,854 | Auger et al. | Jan. 9, 1940 |
| 2,856,082 | Foster et al. | Oct. 14, 1958 |